United States Patent [19]

Fischer et al.

[11] Patent Number: 5,185,390
[45] Date of Patent: Feb. 9, 1993

[54] WATER STRIPPABLE PHOTOCHROMIC RESIN COMPOSITION

[75] Inventors: Scott Fischer, Clinton, Ohio; Cletus N. Welch, Murrysville, Pa.

[73] Assignee: PPG Industries, Inc., Pittsburgh, Pa.

[21] Appl. No.: 802,927

[22] Filed: Dec. 6, 1991

Related U.S. Application Data

[62] Division of Ser. No. 490,029, Mar. 7, 1990, Pat. No. 5,130,353.

[51] Int. Cl.$^5$ .............................................. C08L 1/26
[52] U.S. Cl. ........................................ 524/43; 524/44
[58] Field of Search ............... 524/43, 44; 427/372.2, 427/384, 385.5; 156/247, 328

[56] References Cited

U.S. PATENT DOCUMENTS

| | | | |
|---|---|---|---|
| 3,212,898 | 10/1965 | Cerreta | 96/90 |
| 3,508,810 | 4/1970 | Baltzer | 350/160 |
| 3,522,143 | 7/1970 | Motter | 161/199 |
| 3,625,731 | 12/1971 | Taylor | 117/38 |
| 3,666,352 | 5/1972 | Wagner et al. | 350/160 |
| 3,847,611 | 11/1974 | Van Royen et al. | 430/334 |
| 4,173,672 | 11/1979 | Mannheim | 428/203 |
| 4,268,134 | 5/1981 | Gulati et al. | 351/163 |
| 4,286,957 | 9/1981 | LeNaour-Sene | 8/471 |
| 4,289,497 | 9/1981 | Hovey | 8/506 |
| 4,503,118 | 3/1985 | Murakami et al. | 428/323 |
| 4,614,683 | 9/1986 | Barsotti | 428/220 |
| 4,692,454 | 9/1987 | Mich et al. | 514/312 |
| 4,720,356 | 1/1988 | Chu | 252/586 |
| 4,986,934 | 1/1991 | Kwiatkowski | 252/586 |

FOREIGN PATENT DOCUMENTS 2174711A 11/1986 United Kingdom .

*Primary Examiner*—Nathan M. Nutter
*Assistant Examiner*—Jeffrey Culpeper Mullis
*Attorney, Agent, or Firm*—Irwin M. Stein

[57] ABSTRACT

A process for incorporating by thermal diffusion a photochromic substance into a synthetic organic host material is described. In the process, a surface of the host material containing a coating of a resin composition of from about 5 to about 50 parts of hydroxy ($C_2$-$C_3$) alkyl cellulose, e.g., hydroxy propyl cellulose, and from about 95 to about 50 parts of poly(vinylpyrrolidone), which resin composition contains a photochromic substance, is heated to diffuse at least a portion of the photochromic substance into the surface of the host material. Subsequently, the coating is removed by washing with warm soapy water. In a particular embodiment, the host material is a polymer prepared from diethylene glycol bis(allyl carbonate).

10 Claims, No Drawings

WATER STRIPPABLE PHOTOCHROMIC RESIN COMPOSITION

This is a division of application Ser. No. 07/490,029, filed Mar. 7, 1990, now U.S. Pat. No. 5,130,353.

DESCRIPTION OF THE INVENTION

The present invention relates to photochromic synthetic plastic articles, particularly photochromic optical elements, such as lenses. More particularly, the present invention relates to a method for preparing such articles, which method includes thermally diffusing photochromic substance(s) into the surface of the plastic article from a water-strippable resin coating. Photochromism is a reversible phenomenon exhibited by a compound which, when exposed to light radiation involving ultraviolet rays, such as the ultraviolet radiation of sunlight or the light of a mercury lamp, changes color and then returns to its original color if the light radiation is discontinued.

Several approaches have been used to incorporate photochromic compounds into a synthetic plastic host material. For example, U.S. Pat. No. 3,212,898 describes preparing a photosensitive composition by suspending a photochromic benzospiropyran in a preformed polyester resin. U.S. Pat. No. 3,666,352 describes dispersing a mercury thiocarbazone compound in a solidified plasticized vinyl chloride-vinyl acetate copolymer, which copolymer is laminated between two plastic or glass layers, thereby to form a photochromic sunglass lens.

U.S. Pat. No. 3,508,810 describes preparing a safety glass unit by incorporating a photochromic mercury dithizonate or benzospiropyran compound into the polyvinyl butyral film sealed between the two glass plates of the unit. In one embodiment, a glass plate is coated with the photochromic benzospiropyran compound and the poly(vinyl butyral) plastic film placed over the photochromic coating. A second piece of glass is placed on top of the poly(vinyl butyral) film and the composite structure cured in an autoclave at 275° F. (135° C.) and a pressure of 150 pounds per square inch gauge (1034 kPA). U.S. Pat. No. 3,522,143 describes milling or mixing a photochromic metal dithizonate compound into poly(vinyl butyral) film before sheeting or applying the photochromic compound as a coating onto one of the surfaces of the film to provide a material suitable for use as a lamina or interlayer in a laminated safety glass unit.

U.S. Pat. No. 4,173,672 describes a decorated safety glass comprising two glass sheets joined by a decorated film of a thermoplastic polymer, e.g., a poly(vinyl butyral) film. The thermoplastic polymer is decorated by transferring a colored impression to it from a temporary cellulosic support sheet, e.g., a printed paper bearing a color impression formed of organic or inorganic colorants, by heat and pressure. Subsequently, the temporary cellulosic support sheet is removed and a second sheet of glass placed over the decorated thermoplastic film. The two glass sheets and the interposed decorated film is subjected to heat and pressure until the organic or inorganic colorant becomes impregnated into the interposed thermoplastic film.

U.S. Pat. No. 4,268,134 describes interposing a photochromic glass sheet between two layers of optically clear plastic to produce a light-weight laminated photochromic lens. U.S. Pat. No. 4,289,497 describes a gradient photochromic lens in which the photochromic material is imbibed into the synthetic plastic lens by immersion of the lens into a solution of the photochromic compound.

U.S. Pat. No. 4,286,957 utilizes the conventional "thermal transfer" technique to integrate a photochromic material into a synthetic organic polymer host material. In this technique, the photochromic compound is applied to the surface of the organic host and then heated at between 180° C. and 220° C. for from 30 to 45 seconds to integrate by thermal transfer the photochromic material into the host material.

U.K. Patent application Serial No. 2,174,711 describes a process for incorporating a photochromic compound into a synthetic plastic material by coating the plastic material with a synthetic resin composition containing the photochromic compound and subsequently heating the resin coating at temperatures below the melting temperature of the photochromic compound. The polymeric resin used to form the coating on the surface of the plastic material serves as a solvent for the photochromic compound and may be a material such as poly(vinyl chloride), poly(vinyl acetate), polyurethane, poly(vinyl butyral), copolymers of vinyl chloride and vinyl acetate, copolymers of vinyl chloride and vinylidene chloride, poly(vinyl propionate), cellulose acetate butyrate and polymerizates of acrylic and methacrylic acid esters. Following thermal transfer of the photochromic compound into the surface of the plastic article the resin coating is removed with an organic solvent. Removing of the aforedescribed organic resin coating with an organic solvent, e.g., chlorinated organics, requires installation of equipment for recovery of the organic solvent for reasons of economics and environmental concerns. It would be desirable, therefore, if the resin coating used as a carrier for the photochromic compound could be removed by washing with water, e.g., an aqueous soap solution. Such a development requires a resin that not only is water-soluble or water-dispersible but also is a suitable carrier for the photochromic compound, i.e., it has the physical properties to serve as such a carrier.

It has now been discovered that organic resin compositions comprising a blend of poly(vinyl pyrrolidone) and hydroxy ($C_2$–$C_3$) alkyl cellulose may be used as the carrier resin for organic photochromic compounds. Such resin compositions may be used to apply a coating to the surface of a synthetic plastic material that is relatively thin and substantially mottle-free.

The hereinafter described method may be used to prepare photochromic plastic film, sheet, and castings useful in optical applications such as plano sunglasses, ski goggles, visors, camera lenses, optical filters, lens blanks, opthalmic lenses, aircraft transparencies and automotive transparencies, e.g., automotive windshields, T-roofs, and side and back windows.

DETAILED DESCRIPTION OF THE INVENTION

In accordance with the process of the present invention, a thin coating of a poly(vinyl pyrrolidone)-hydroxy ($C_2$–$C_3$) alkyl cellulose composition having at least one photochromic substance, e.g., a spiro(indolino)-type photochromic substance, homogeneously dispersed or dissolved therein is applied to a surface, e.g., a substantially planar surface of a synthetic plastic host article. The surface of the plastic host article to which the aforedescribed coating is applied may be substantially flat or have some degree or curvature, such as the convex and/or concave surface of a lens. As used herein, the terms "principal" or "planar" are intended to refer to that surface or those surfaces (flat or curved) of the article other than a surface corresponding to the width or thickness of the article.

The photochromic-containing resin composition of the present invention is applied to the selected surface of the plastic host by a technique that provides a substantially mottle-free film or coating of substantially uniform thickness across the surface. It is also contemplated that different surfaces or even different parts or portions of the same surface may have a film of varying thickness and such films may contain different concentrations of photochromic substances, thereby to vary the amount of photochromic imbibed into the surface and hence vary the intensity of the color change in different portions of the plastic host. By substantially mottle-free is meant that the film is essentially free of droplets, ridges, streaks, blotches, spots, etc. of solidified resin produced by non-uniformity in film thickness or uneven solvent removal. The thickness of the coating or film is not critical but commonly will be between about 0.5 and 3.0 mils (0.0005–0.003 inches), e.g., 1–2 mils.

The aforedescribed film should be sufficiently thin to enable the photochromic substance to thermally transfer efficiently to the plastic host and permeate or diffuse readily into the subsurface of the plastic host, e.g., from just below the surface to a depth of about 50 microns, thereby to produce a synthetic plastic article exhibiting a photochromic response, i.e., exhibiting a change in transmission upon exposure to ultraviolet irradiation, which change in transmission (color change) can be visualized. If the resin film is too thick, it can crack. Moreover, thick films are more difficult to remove from the surface of the plastic host. Further, a significant amount of the photochromic substance may not be transferred from a thick coating, which adds an adverse economic burden to the process by loss of the residual photochromic substance remaining in the resin, or by adding the cost of recovering the photochromic substance from the resin following thermal transfer.

The amount of photochromic material required to achieve a visual photochromic response by the treated plastic host, i.e., a photochromic amount, may vary and will generally depend upon the intensity of the color change desired upon ultraviolet irradiation of the treated plastic article and the photochromic material used. The greater the desired change in color intensity, the larger the amount of photochromic material required to be incorporated in the treated plastic host. Typically, a photochromic response may be achieved when the amount of photochromic material dispersed within the plastic host is from about 0.2 or 0.5 to 10, e.g., 5, milligram per square inch, based on the area of one planar surface. Expressed differently, the amount of photochromic substance(s) incorporated into the plastic article generally may vary from about 0.01 to about 10 or 20 weight percent (based on the weight of the plastic article). More typically, the amount of photochromic substance(s) incorporated may range from about 0.01 to about 2 weight percent, e.g., from about 0.05 to about 1 weight percent.

The resin composition used to form the coating on the surface of the plastic host material serves as a carrier for the photochromic substance, e.g., a spiro(indolino)-type photochromic material such as a spiro(indolino) pyridobenzoxazine. The resin composition may be a blend of from about 5 to about 50 parts of hydroxy ($C_2$–$C_3$) alkyl cellulose and from about 95 to about 50 parts of poly(vinyl pyrrolidone). Contemplated further are resin compositions of a blend of from about 5 to about 15 or 30 parts by weight of hydroxy ($C_2$–$C_3$) alkyl cellulose and from about 95 to about 85 or 70 parts respectively of poly(vinyl pyrrolidone). In a preferred embodiment, the resin composition will contain about 10 parts of hydroxy ($C_2$–$C_3$) alkyl cellulose and about 90 parts of poly(vinyl pyrrolidone). The exact proportions of poly(vinyl pyrrolidone) and hydroxy alkyl cellulose used may be readily determined by one skilled in the art. Such proportions may depend, in part, on the physical state of the photochromic substance(s) at room temperature, i.e., a solid or liquid, and the solubility of the photochromic substance in the resin composition. Solid photochromic substances generally require resin compositions with higher levels of hydroxy alkyl cellulose than liquid photochromic substances.

Criteria to be considered in preparing the resin composition are the flow properties of the photochromic substance-containing resin composition at (1) the temperatures at which the resin is applied to the surface of the synthetic host material and at (2) the temperature used to accomplish thermal transfer of the photochromic substance, and the solubility of the photochromic material in the resin composition. The aforesaid resin composition should have good flow properties in solution, i.e., it should flow readily when it is applied to the surface of the host material so as to obtain a mottle-free coating. However, after the resin coating has dried, it should not flow significantly at thermal transfer temperatures. Generally, if the resin composition flows too freely during thermal transfer, the level of hydroxy alkyl cellulose should be reduced and vice versa. The photochromic material should be substantially soluble in the resin composition chosen in order to avoid forming crystals of solid photochromic in the dried film coating the surface of the synthetic plastic host. Such crystals may result in the surface having a speckled appearance after thermal transfer of the photochromic.

Poly(N-vinyl-2-pyrrolidone), which is referred to herein as poly(vinyl pyrrolidone) or PVP, is commercially available. It is prepared by free-radical initiation of the monomer N-vinyl-2-pyrrolidone. The polymer is available in several basic commercial grades, which are referred to as grades K-15, K-30, K-60 and K-90. The K-15 and K-30 grades are described as off-white powders having a number average molecular weight of about 10,000 and about 40,000 respectively (about 95% active). The K-60 grade is described as a clear, viscous aqueous solution (about 45% active), which grade has a number average molecular weight of about 160,000. The K-90 grade is available as an off-white solid having a number average molecular weight of about 360,000 or as a clear, viscous aqueous solution (about 20% active). PVP is also available in pharmaceutical and beverage-clarification grades. In the process of the present invention, it is contemplated that PVP having a number average molecular weight of from about 160,000 to about 360,000 be used.

Homopolymers of PVP provide coatings that may be too rigid to be used alone as the resin carrier for some photochromic substances. However, by blending from about 5 to about 50, e.g., about 5 to about 15, parts by weight of hydroxy ($C_2$–$C_3$) alkyl cellulose with the PVP, coatings having acceptable flow properties for use in the thermal diffusion process of the present invention may be prepared. Hydroxy alkyl cellulose polymers that may be used with the PVP are the hydroxy ($C_2$–$C_3$) alkyl cellulose polymers, namely hydroxy ethyl cellulose, hydroxy propyl cellulose and methyl hydroxy propyl cellulose. Such polymers are also available commercially.

In a particular embodiment of the present invention, hydroxy propyl cellulose is used. Hydroxy propyl cellulose, sometimes referred to herein as HPC, may be prepared by the base-catalyzed reaction of propylene oxide with cellulose. It is manufactured in various viscosity grades ranging from about 10–20 centipoises to about 4,000–6,500 centipoises (1 percent solution measured at 25° C.). The weight average molecular weights of such HPC products commonly range from about 60,000 to about 1,150,000. In accordance with a preferred embodiment of the present invention, the hydroxy propyl cellulose will have a weight average molecular weight of from about 60,000 to about 120,000, e.g., about 80,000.

An appropriate blend of the hydroxy alkyl cellulose and PVP in the proportions described provides a composition that in the form of a film (1) flows more readily than PVP alone and (2) does not become mottled during the thermal transfer step of the herein described method. The polymer blend is typically applied to the surface of the plastic in the form of a solution in an organic solvent, e.g., a 7.5 weight percent solution in butanol.

As previously noted, the method of the present invention is advantageously practiced by applying to the surface of the plastic host a solution or dispersion of the photochromic substance dissolved or dispersed in a carrier of the aforedescribed PVP-HPC resin blend. The carrier resin will, in general, be part of a carrier composition which will include a solvent vehicle for the resin. The solvent vehicle should be readily volatile at ambient temperatures, e.g., room temperature (20°–22° C.), and also preferably be colorless. The solvent vehicle also should not adversely affect the surface of the plastic host material, the resin or the photochromic substance(s). The carrier composition, which includes the carrier resin, the photochromic substance(s) and the solvent vehicle, will typically comprise between about 5 and about 25, e.g. between about 5 and about 18, weight percent of photochromic substance(s), between about 5 and about 10, e.g., between about 5 and about 7, weight percent of carrier resin and between about 65 and about 90, e.g., between about 75 and 90, weight percent of solvent vehicle. The photochromic substance may constitute between about 30 and 85 weight percent, more preferably between 50 and about 75, e.g., from about 60 to 70, weight percent, of the dried solid resin film.

Suitable solvent vehicles for the PVP-HPC carrier resin may be selected from the following organic materials: methanol, ethanol, propanol, isopropanol, butanol, amyl alcohol, 2-ethyl-1-hexanol, cyclohexanol, ethylene glycol, propylene glycol, 1,3-butane diol, glycerine, diacetone alcohol, diethylene glycol, triethylene glycol, propylene glycol monomethyl ether, methyl cyclohexanone, 2-pyrrolidone, N-methyl-2/-pyrrolidone and N-vinyl-2-pyrrolidone. Preferably, the solvent vehicle is a lower, e.g., $C_1$–$C_5$, aliphatic alcohol such as, for example, isopropanol and n-butanol.

The carrier composition may be prepared readily by any suitable technique, e.g., by dissolving independently the PVP and HPC in the chosen solvent vehicle, e.g., butanol, and thereafter combining the resultant solutions with or without additional solvent followed by addition of the photochromic substance. In a particular embodiment of the present process, solid PVP having an average molecular weight of about 360,000 is dissolved in butanol to form a 10 weight percent polymer solution. HPC is dissolved similarly in butanol to form a 10 weight percent solution. Appropriate amounts of the two solutions are then combined with additional butanol to form the desired blend. The photochromic substance may then be added to the resulting solution to form the carrier composition.

The carrier composition is applied to a principal surface, e.g., a substantially flat surface, of the plastic host article by techniques known in the art that are suitable for producing a substantially mottle-free coating or film of substantially uniform thickness. Application techniques that may be employed may include spraying, brushing, spin-coating, dip-coating and use of a draw-down blade or wire bar.

Before applying the carrier composition to the plastic host, the surface of the plastic to which the resin is to be applied is preferably cleaned. Cleaning may be accomplished by washing the surface with an aqueous medium, e.g., soapy water, to remove dust and dirt; washing the surface with an organic solvent such as methylchloroform or methylethylketone to remove any organic film present on the surface; and/or eliminating static charges that are present on the surface of the plastic material. Elimination of static electricity can be accomplished by commercially available equipment which ionize the air above the surface, thereby producing a conductive path which allows the static charge to drain off or otherwise be neutralized.

The surface of the plastic material to which the resin is applied should be receptive to imbibition of the photochromic substance during the heating step. If the receptor surface is not amenable to imbibition, it can be treated to permit improved diffusion of the photochromic substance into the subsurface of the plastic host, e.g., by physically or chemically etching the surface. A receptive surface can be achieved usually by undercuring slightly the plastic during its formation, or by addition of a plasticizer to the monomeric material(s) used to prepare the organic plastic host. Such techniques are conventional in the polymerization art.

Following application of the photochromic-bearing resin film to the surface(s) of the plastic host material, the substantially dry film is permitted to completely dry. Drying can be conveniently conducted at room temperature in air; but, other conditions of drying which are designed to avoid crystallization of the photochromic compound within the resin film may be used as the occasion warrants. Thereafter, the coated plastic article is heated substantially uniformly to thermally transfer the photochromic compound into the surface of the plastic host material. Heating may be accomplished by any convenient technique which results in substantially uniform heating of the film and plastic host. Preferably, heating is accomplished in a conventional hot air recirculating oven, which allows for uniform heating and hence a constant driving force for transfer of the photochromic compound into the plastic host. Heating may also be accomplished in a vacuum or with use of an inert, e.g., nitrogen atmosphere.

The intensity and duration of the heating step should be sufficient to obtain thermal transfer (permeation) of the photochromic substance(s) to the desired depth within the plastic surface without extensive softening of the synthetic plastic. Temperatures will vary depending on the particular photochromic substance utilized as well as the softening temperature of the synthetic plastic article. Moreover, the intensity of the thermal diffusion step should be such as to minimize decomposition (pyrolysis) of the photochromic substance. Hence, the transfer temperatures chosen are sufficient to provide the thermal driving force required to allow the photochromic substance to permeate into the surface of the synthetic plastic article without significant decomposition of the photochromic substance and softening of the plastic host. Given the above requirements, one skilled in the art may readily determine an appropriate temperature for heating the coated plastic article. In embodiments contemplated herein, wherein the photochromic substances are spiro(indolino)-type photochromic substances, e.g., spiro(indolino) naphthoxazines, spiro(indolino) pyridobenzoxazines, and spiro(indolino) benzoxazines, temperatures of between about 80° C. and about 180° C., preferably from about 100° C. to 150° C., e.g., 135° C. are contemplated.

The coated plastic surface is maintained at the above-described transfer temperatures for a time sufficient to allow a substantial portion of the photochromic substance within the resin film, i.e., a photochromic amount, to diffuse into and penetrate beneath the surface of the plastic host. Typically, heating times may vary from about several minutes to several hours, e.g., from 15 minutes to from 2 to 4 hours. Generally, heating times will vary indirectly with the transfer temperature.

Following transfer of the photochromic substance into the surface of the plastic article, the coated plastic article is allowed to cool, e.g., to room temperature, and subsequently the residual resin film, its concentration of photochromic substance reduced, is stripped from the surface of the plastic host by contact with water, thereby leaving a photochromic amount of the photochromic substance(s) entirely disposed beneath the surface of the plastic host material. Removal of the photochromic substance-depleted film may be accomplished by contacting the surface with water, e.g., hot water, and preferably with water containing a suitable surfactant. It is contemplated that the resin film can be stripped from the surface by immersing it in a hot soapy water bath and agitating and/or vibrating the bath, thereby to obtain a cleaned surface devoid of carrier resin.

Adjuvant materials may also be incorporated into the surface of the plastic host prior to, simultaneously with or subsequent to thermal transfer of the photochromic substance(s). For example, ultraviolet light absorbers may be mixed with photochromic substances before their application to the host material or such absorbers may be superposed, e.g., superimposed, as a layer between the photochromic substance and the incident light. Further, stabilizers may be admixed with the photochromic substances prior to their application to the host material to improve the light fatigue resistance of the photochromic substances or, such stabilizers may be diffused into the surface of the plastic host material subsequent to diffusion of the photochromic substance(s) in a manner similar to that used to thermally transfer the photochromic substance(s).

Conventional ultraviolet light absorbers such as benzophenone and benzotriazole-type compounds are contemplated for use in conjunction with the photochromic substance(s) incorporated into the plastic surface. Stabilizers, such as hindered amine light stabilizers and singlet oxygen quenchers, e.g., a nickel ion complex with an organic ligand, are also contemplated for use with the photochromic substance(s). The hindered amine and singlet oxygen quencher may be used alone or in combination. Hindered amine light stabilizers are known in the art and are described in U.S. Pat. No. 4,720,356. These stabilizers typically comprise derivatives of tetramethyl piperidine. The disclosure of U.S. Pat. No. 4,720,356 respecting hindered amine compounds and singlet oxygen quenching compounds is incorporated herein by reference.

In a particular embodiment of the present process, it is contemplated that the photochromic substance(s) are thermally diffused into the surface of the plastic host material in the manner described herein, and thereafter a similar resin composition, i.e., the aforedescribed PVP-hydroxy alkyl cellulose resin composition containing ultraviolet light absorbers and/or hindered amine light stabilizers and/or singlet oxygen quenchers, is applied to the surface of the plastic host material into which the photochromic substance had previously been diffused and a stabilizing amount thereof also thermally transferred therein. This places the ultraviolet light absorber/hindered amine light stabilizer/singlet oxygen quencher in near proximity to the photochromic substance(s) within the subsurface of the plastic host material.

Typically, a sufficient amount, i.e., a "photochromic amount", of the photochromic substance(s) is transferred to the plastic matrix so that the resulting surface is photochromic, i.e., produces a photochromic effect. By "photochromic" or "photochromic effect" is meant that when the photochromic-containing surface is exposed to ultraviolet light, the surface visibly changes color (or becomes colored) and then returns to its original color or colorless state when the ultraviolet light is removed. The photochromic effect may be readily observed by exposing such surface to a source of natural ultraviolet light, such as the sun, or to an artificial ultraviolet light source, such as a Spectroline Super ® Lamp, Model M ENF-28 (365 nanometers).

Photochromic substances that may be used to prepare the photochromic article of the present invention may be any suitable organic photochromic substance(s) that: (a) provides a visual photochromic response when incorporated into a synthetic organic polymer used to prepare synthetic organic photochromic articles, (b) that is soluble within the organic polymer, the carrier resin and carrier composition, and (c) that are chemically compatible with the synthetic organic polymer. Thus, photochromic substances that may be used may be selected from a variety of classes of compounds. Particularly contemplated classes of photochromic compounds that may be used include: spiro(indolino)-type compounds, such as spiro(indolino)pyridobenzoxazines, spiro(indolino)naphthoxazines, spiro(benzindolino)pyridobenzoxazines, spiro(benzindolino)-naphthoxazines, spiro(benzindolino)naphthopyrans, spiro(indolino)-benzopyrans, spiro(indolino)naphthopyrans, spiro(indolino)quinopyrans, spiro(indolino)benzoxazines, spiro(benzindolino) benzoxazines, chromenes, e.g., benzopyrans and naphthopyrans, metal dithizonate compounds, fulgides or fulgimides and spiro(di)hydroindolizines.

The particular photochromic substance(s) selected for use will depend on its compatibility with the resin, including its solubility therein, and the particular change in color desired for the photochromic article. It is also contemplated that mixtures of two or more photochromic substances may be used. The particular photochromic substance used is not critical to the practice of the present invention provided that it satisfies the above-described criteria. Hence, it is contemplated that the present invention is applicable to photochromic substances known and presently unknown which satisfy the aforesaid criteria.

Photochromic compounds that may be utilized to prepare photochromic articles of the present invention, such as those heretofore described are for the most part described in the open literature. For example, spiro(indolino)naphthoxazines have been described, among others, in U.S. Pat. Nos. 3,562,172, 3,578,602, 4,215,010 and 4,342,668. Spiro(indolino)pyridobenzoxazines are described in U.S. Pat. No. 4,637,698. Spiro(benzindolino)pyrido-benzoxazines and spiro(benzindolino)-naphthoxazines are described in U.S. Pat. No. 4,931,219. Spiro(benzindolino)naphthopyrans are described in Japanese patent publication 62/195383. Spiro(indolino)benzoxazines are described in U.S. Pat. No. 4,816,584. Spiro(indolino)benzopyrans, spiro(indolino)-naphthopyrans and spiro(indolino)quinopyrans are described, for example, in U.S. Pat. No. 4,880,667. Spiro(indolino)pyrans are also described in the text, *Techniques of Chemistry*, Volume III, "Photochromism", Chapter 3, Glenn H. Brown, Editor, John Wiley and Sons, Inc. New York 1971.

Spiro(benzindolino)naphthopyrans described in Japanese patent publication 62/195383 may be represented by the graphic formula,

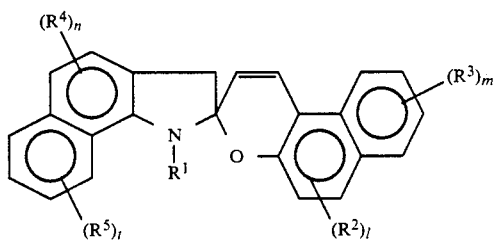

wherein $R^2$, $R^3$, $R^4$ and $R^5$ are alkyl groups having 1–4 carbons, halogen-substituted alkyl groups having 1 or 2 carbons, alkoxy groups having 1–4 carbons, halogen groups, or nitro group, 1 and n are integers of 0–2, m and t are integers of 0–4, where $R^2$, $R^3$, $R^4$ and $R^5$ may be identical or different; $R^1$ represents an unsubstituted or substituted alkyl group having 1–20 carbons, unsubstituted or substituted cycloalkyl group having 3–10 carbons, an unsubstituted or substituted aralkyl group having 7–20 carbons, or an unsubstituted or substituted aryl group having 6–14 carbons.

Photochromic organo-metal dithizonates, i.e., (arylazo)thioformic arylhydrazidates, e.g., mercury dithizonates, are described in, for example, U.S. Pat. No. 3,361,706. Fulgides and fulgimides, e.g. the 3-furyl and 3-thienyl fulgides and fulgimides are described in U.S. Pat. No. 4,220,708. 3-pyrryl fulgides and fulgimides are described in U.S. Pat. No. 4,737,449. Spiro(di)hydroindolizines are described, for example, in U.S. Pat. No. 4,931,220. Certain chromenes, i.e., benzopyrans and naphthopyrans, are described in U.S. Pat. Nos. 3,567,605 and 4,826,977.

Those portions of the aforementioned identified patent publications and applications that describe the various photochromic compounds generically and specifically are hereby incorporated in toto by reference. In particular, U.S. Pat. No. 4,931,220, which describes specific spiro(indolino)-type photochromic compounds and other photochromic compounds and the disclosure relating thereto, are incorporated herein in toto by reference.

The polymer host material will usually be transparent, but may be translucent or even opaque. The polymer product need only be transparent to that portion of the electromagnetic spectrum, which activates the photochromic substance, i.e., that wavelength of ultraviolet (UV) light that produces the open form of the substance and that portion of the visible spectrum that includes the absorption maximum wavelength of the substance in its UV activated form, i.e., the open form. Further, the resin color should not be such that it masks totally the color of the activated form of the photochromic substance, i.e., so the change in color is readily apparent to the observer. Preferably, the host material article is a solid transparent material or an optically clear material, e.g., materials suitable for ophthalmic elements, such as ophthalmic lenses, or materials useful for applications such as windows, windshields, aircraft transparencies, etc.

Examples of host materials which may be used with the photochromic substances or compositions described herein include: polymers, i.e., homopolymers and copolymers, of polyol(allyl carbonate) monomers, polymers, i.e., homopolymers and copolymers, of polyfunctional acrylate monomers, polyacrylates, poly(alkylacrylates) such as poly(methyl methacrylate), cellulose acetate, cellulose triacetate, cellulose acetate propionate, cellulose acetate butyrate, poly(vinyl acetate), poly(vinyl alcohol), poly(vinyl chloride), poly(vinylidene chloride), polyurethanes, polycarbonates, poly(ethylene terephthalate), polystyrene, copoly(styrene-methyl methacrylate) copoly(styrene-acrylonitrile), poly(vinyl butyral) and polymers, i.e., homopolymers and copolymers, of diallylidene pentaerythritol, particularly copolymers with polyol (allyl carbonate) monomers, e.g., diethylene glycol bis(allyl carbonate), and acrylate monomers.

Blends of the aforesaid transparent polymers are also suitable as host materials. Preferably, the host material is an optically clear polymerized organic material prepared from a polycarbonate resin, such as the carbonate-linked resin derived from bisphenol A and phosgene, which is sold under the trademark, LEXAN; a poly(methyl methacrylate), such as the material sold under the trademark, PLEXIGLAS; polymerizates of a polyol(allyl carbonate), especially diethylene glycol bis(allyl carbonate), which monomer is sold under the trademark, CR-39, and polymerizates of copolymers of diethylene glycol bis(allyl carbonate) with other copolymerizable monomeric materials, such as copolymers with vinyl acetate, e.g., copolymers of from 80–90 percent diethylene glycol bis(allyl carbonate) and 10–20 percent vinyl acetate, particularly 80–85 percent of the bis(allyl carbonate) and 15–20 percent vinyl acetate, and copolymers with a polyurethane having terminal diacrylate functionality, as described in U.S. Pat. No. 4,360,653; cellulose acetate, cellulose propionate, cellulose butyrate, cellulose acetate butyrate, polystyrene and copolymers of styrene with methyl methacrylate, vinyl acetate and acrylonitrile.

Polyol (allyl carbonate) monomers which may be polymerized to form a transparent host material are the allyl carbonates of linear or branched aliphatic or aromatic liquid polyols, e.g., aliphatic glycol bis(allyl carbonate) compounds, or alkylidene bisphenol bis(allyl carbonate) compounds. These monomers can be described as unsaturated polycarbonates of polyols, e.g., glycols. The monomers can be prepared by procedures well known in the art, e.g., U.S. Pat. Nos. 2,370,567 and 2,403,113.

The polyol (allyl carbonate) monomers may be represented by the graphic formula:

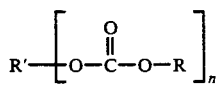   (I)

wherein R is the radical derived from an unsaturated alcohol and is commonly an allyl or substituted allyl group, R' is the radical derived from the polyol, and n is a whole number from 2-5, preferably 2. The allyl group (R) can be substituted at the 2 position with a halogen, most notably chlorine or bromine, or an alkyl group containing from 1 to 4 carbon atoms, generally a methyl or ethyl group. The R group can be represented by the graphic formula:

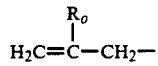   (II)

wherein $R_o$ is hydrogen, halogen, or a $C_1$-$C_4$ alkyl group. Specific examples of R include the groups: allyl, 2-chloroallyl, 2-bromoallyl, 2-fluoroallyl, 2-methylallyl, 2-ethylallyl, 2-isopropylallyl, 2-n-propylallyl, and 2-n-butylallyl. Most commonly R is the allyl group, $H_2C=CH-CH_2-$.

R' is a polyvalent radical derived from the polyol, which can be an aliphatic or aromatic polyol that contains 2, 3, 4 or 5 hydroxy groups. Typically, the polyol contains 2 hydroxy groups, i.e., a glycol or bisphenol. The aliphatic polyol can be linear or branched and contain from 2 to 10 carbon atoms. Commonly, the aliphatic polyol is an alkylene glycol having from 2 to 4 carbon atoms or a poly($C_2$-$C_4$) alkylene glycol, i.e., ethylene glycol, propylene glycol, trimethylene glycol, tetramethylene glycol, or diethylene glycol, triethylene glycol, etc.

The aromatic polyol can be represented by the graphic formula:

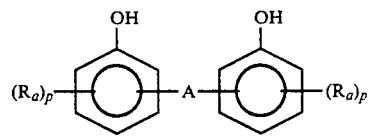   (III)

wherein A is a bivalent radical derived from an acyclic aliphatic hydrocarbon, e.g., an alkylene or alkylidene radical, having from 1 to 4 carbon atoms, e.g., methylene, ethylene, and dimethylmethylene (isopropylidene), $R_a$ represents lower alkyl substituents of from 1 to 3 carbon atoms, and halogen, e.g., chlorine and bromine, and p is 0, 1, 2, or 3. Preferably, the hydroxyl group is in the ortho or para position.

Specific examples of the radical R' include: alkylene groups containing from 2 to 10 carbon atoms such as ethylene, ($-CH_2-CH_2-$), trimethylene, methylethylene, tetramethylene, ethylethylene, pentamethylene, hexamethylene, 2-methylhexamethylene, octamethylene, and decamethylene; alkylene ether groups such as $-CH_2-O-CH_2-$, $-CH_2CH_2-O-CH_2CH_2-$, $-CH_2-O-CH_2-CH_2-$, and $-CH_2CH_2CH_2-O-CH_2CH_2CH_2-$; alkylene polyether groups such as $-CH_2CH_2-O-CH_2CH_2-O-CH_2CH_2-$, and $-CH_2CH_2CH_2-O-CH_2CH_2CH_2-O-CH_2CH_2CH_2-$; alkylene carbonate and alkylene ether carbonate groups such as $-CH_2CH_2-O-CO-O-CH_2CH_2-$ and $-CH_2CH_2-O-CH_2CH_2-O-CO-O-CH_2CH_2-O-CH_2CH_2-$; and isopropylidene bis(para-phenyl), i.e., 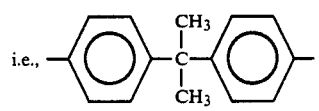   (IV)

Most commonly, R' is $-CH_2CH_2-$, $-CH_2CH_2-O-CH_2CH_2-$, or $-CH_2CH_2-O-CH_2C-H_2-O-CH_2CH_2-$.

Specific non-limiting examples of polyol (allyl carbonate) monomers include ethylene glycol bis(2-chloroallyl carbonate), ethylene glycol bis(allyl carbonate), diethylene glycol bis(2-methallyl carbonate), diethylene glycol bis(allyl carbonate), triethylene glycol bis(allyl carbonate), propylene glycol bis(2-ethylallyl carbonate), 1,3-propanediol bis(allyl carbonate), 1,3-butanediol bis(allyl carbonate), 1,4-butanediol bis(2-bromoallyl carbonate), dipropylene glycol bis(allyl carbonate), trimethylene glycol bis(2-ethylallyl carbonate), pentamethylene glycol bis(allyl carbonate), and isopropylidene bisphenol bis(allyl carbonate).

Industrially important polyol bis(allyl carbonate) monomers which may be utilized in the invention herein contemplated are:

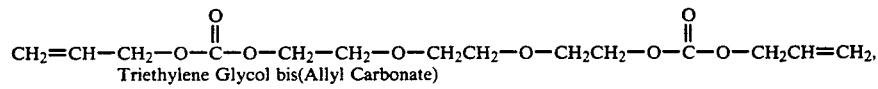

Triethylene Glycol bis(Allyl Carbonate)

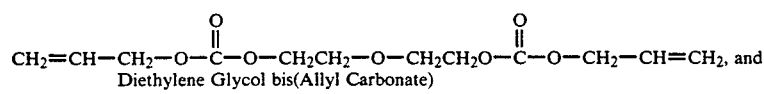

Diethylene Glycol bis(Allyl Carbonate)

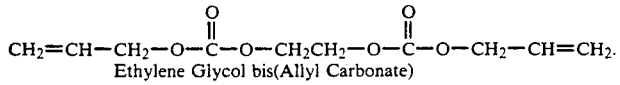
Ethylene Glycol bis(Allyl Carbonate)

Diethylene glycol bis(allyl carbonate) is preferred.

Because of the process by which the polyol(allyl carbonate) monomer is prepared, i.e., by phosgenation of the polyol (or allyl alco- hol) and subsequent esterification by the allyl alcohol (or polyol), the monomer product can contain related monomer species in which the moiety connecting the allyl carbonate groups contains one or more carbonate groups. These related monomer species can be represented by the graphic formula:

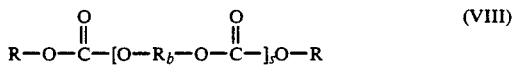

wherein R is as defined above, $R_b$ is a bivalent radical, e.g., alkylene or phenylene, derived from a diol, and s is a whole number from 2 to 5. The related monomer species of diethylene glycol bis(allyl carbonate) can be represented by the graphic formula,

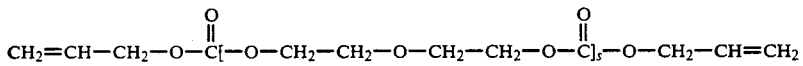

wherein s is a whole number from 2 to 5. The polyol (allyl carbonate) monomer can typically contain from 2 to 20 weight percent of the related monomer species and such related monomer species can be present as mixtures, i.e., mixtures of the species represented by s being equal to 2, 3, 4 etc.

In addition, a partially polymerized form of the polyol (allyl carbonate) monomer, i.e., prepolymer, can be used. In that embodiment, the monomer is thickened by heating or partially polymerized by using small, e.g., 0.5-1.5 parts of initiator per hundred parts of monomer (phm), to provide a non-gel containing, more viscous monomeric material.

As used in the present description and claims, the term polyol(allyl carbonate) monomer or like names, e.g., diethylene glycol bis(allyl carbonate), are intended to mean and include the named monomer or prepolymer and any related monomer species contained therein.

Polyfunctional acrylate monomers that may be used to prepare synthetic polymeric host materials are esterification products of an acrylic acid moiety selected from the group consisting of acrylic acid and methacrylic acid, and a polyol, e.g., a diol, a triol or tetracarbinol. More particularly, the polyfunctional acrylate monomer may be represented by the following graphic formula:

wherein $R_t$ is hydrogen or methyl, n is the number 2, 3, or 4, and R" is the multivalent radical, i.e., a bivalent, trivalent or tetravalent alkoxy radical, remaining after removal of the hydroxy hydrogen atoms from a polyol, having from 2 to 4 hydroxy groups, e.g., a diol, a triol or tetracarbinol respectively. More particularly, $R_t$ is hydrogen or methyl, and n is 2 or 3, more usually 2.

R" may be selected from the group consisting of alpha, omega $C_2$-$C_8$ glycols, cyclohexane diol, diethylene glycol, triethylene glycol, tetraethylene glycol, dipropylene glycol, $C_2$-$C_5$ triols and pentaerythritol. Examples of such polyols include ethylene glycol, trimethylene glycol, 1,4-butane diol, 1,5-pentane diol, 1,6-hexane diol, propylene glycol, trimethylol propane, glycerol and the like.

Examples of polyfunctional acrylate monomers, such as diacrylates and triacrylates, include: ethylene glycol diacrylate, ethylene glycol dimethacrylate, 1,2-propane diol diacrylate, 1,3-propane diol diacrylate, 1,2-propane diol dimethacrylate, 1,3-propane diol dimethacrylate, 1,4-butane diol diacrylate, 1,3-butane diol dimethacrylate, 1,4-butane diol dimethacrylate, 1,5-pentane diol diacrylate, 2,5-dimethyl-1,6-hexane diol dimethacrylate, diethylene glycol diacrylate, diethylene glycol dimethacrylate, triethylene glycol dimethacrylate, trimethylol propane trimethacrylate, tetraethylene glycol diacrylate, tetraethylene glycol dimethacrylate, dipropylene glycol diacrylate, dipropylene glycol dimethacrylate, trimethylol propane triacrylate, glycerol triacrylate, glycerol trimethacrylate, pentaerythritol triacrylate, pentaerythritol dimethacrylate, pentaerythritol tetraacrylate, pentaerythritol tetramethacrylate and mixtures of such acrylate monomers.

A portion of the polyfunctional acrylate monomer may be replaced with a monofunctional copolymerizable monomer containing the vinyl ($CH_2$=CH—) grouping. Such compatible monomers include monofunctional acrylic and methacrylic acid esters, and vinyl esters of $C_2$-$C_6$ carboxylic acids, i.e., vinyl carboxylates. Preferably, the copolymerizable monomer is a non-aromatic, e.g., non-benzenoid, containing monomer. Monofunctional acrylic or methacrylic ester monomers may be graphically illustrated by the following formula,

wherein $R_t$ is hydrogen or methyl, and R''' is selected from the group consisting of $C_1$-$C_{12}$, e.g., $C_1$-$C_8$, alkyl, $C_5$-$C_6$ cycloalkyl, glycidyl and hydroxyethyl. Preferably, R''' is a $C_1$-$C_4$ alkyl, e.g., methyl or cyclohexyl.

Examples of monofunctional acrylic acid type monomers include, for example, the acrylic and methacrylic acid esters of alkanols such as methanol, ethanol, propanol, butanol, pentanol, hexanol, heptanol and octanol, e.g., methyl acrylate, methyl methacrylate, ethyl acrylate and ethyl methacrylate, cycloalkanols such as cyclopentanol and cyclohexanol, glycidol (3-hydroxy propylene oxide, (d, 1, dl)) and ethylene glycol. Examples of vinyl carboxylates include vinyl acetate, vinyl propionate, vinyl butyrate and vinyl valerate. In addition to and/or in place of the aforedescribed monofunctional copolymerizable monomer, monofunctional allylic and difunctional allylic copolymerizable compatible monomers may also replace a portion of the polyfunctional acrylate monomer. Monofunctional allylic monomers contemplated include allyl esters of $C_2$-$C_6$ carboxylic acids, $C_1$–$C_6$ allyl ethers and other copolymerizable allyl compounds. Preferably the monofunctional allylic monomer is a non-aromatic compound. Difunctional allylic copolymerizable monomers contemplated herein are the polyol (allyl carbonates) monomers of graphic formula VI.

The present process is more particularly described in the following examples which are intended as illustrative only since numerous modifications and variations therein will be apparent to those skilled in the art.

EXAMPLE 1

10.0 grams of poly(vinyl pyrrolidone) (PVP) having a molecular weight of about 360,000 was mixed with 90.0 grams of butanol and stirred overnight at 40° C. 10.0 grams of hydroxypropyl cellulose (HPC) having a molecular weight of about 60,000 was mixed with 90.0 grams of butanol and stirred overnight at 40° C. Portions of the PVP-butanol and HPC-butanol solutions were mixed with further butanol and the organic photochromic materials 5,7-dimethoxy-1′, 3′,3′, 4′ (6′), 5′-pentamethylspiro[2H-1,4-benzoxazine-2,2′-indoline] in the amounts tabulated in Table I to obtain photochromic solutions having 50/50, 70/30, 90/10 and 100/0 PVP/HPC ratios.

TABLE I

| Ingredient | PVP/HPC RATIO | | | |
|---|---|---|---|---|
| | 50/50 | 70/30 | 90/10 | 100/0 |
| PVP Solution, grams | 1.125 | 1.575 | 2.025 | 2.25 |
| HPC Solution, grams | 1.125 | 0.675 | 0.225 | — |
| Butanol, grams | 0.75 | 0.75 | 0.75 | 0.75 |
| Photochromic, grams | 0.45 | 0.45 | 0.45 | 0.45 |

An equal aliquot of each of the photochromic solutions of Table I was applied to separate 4-base plano lenses prepared from a CR-39 ® allyl diglycol carbonate monomer composition using a top side spin coating technique, and the coated lenses dried. The dried lenses were placed in an air circulating oven maintained at 135° C. for 165 minutes to thermally transfer the photochromic to the lens. The lenses were then removed from the oven, cooled and placed in warm tap water to remove the spent film. The film washes off easily from the lenses.

EXAMPLE 2

The procedure of Example 1 was followed to prepare photochromic coating solutions with the organic photochromic material 1,3,3,4(6),5-pentamethylspiro[indoline-2,3′[3H]pyrido[3,2-f][1,4] benzoxazine] and with a lower ratio of photochromic to resin solids than in Example 1. The amount of each ingredient is tabulated in Table II.

TABLE II

| Ingredient | PVP/HPC RATIO | | | |
|---|---|---|---|---|
| | 50/50 | 70/30 | 90/10 | 100/0 |
| PVP Solution, grams | 4.50 | 6.30 | 8.10 | 9.0 |
| HPC Solution, grams | 4.50 | 2.70 | 0.90 | — |
| Butanol, grams | 3.0 | 3.0 | 3.0 | 3.0 |
| Photochromic, grams | 0.45 | 0.45 | 0.45 | 0.45 |

An equal aliquot of each of the photochromic solutions of Table II was applied to separate 4-base plano lenses of the type described in Example 1. The coated lenses were dried and the photochromic thermally transferred to the lens in the manner described in Example 1. Removal of the spent film was accomplished by washing the lenses in warm tap water.

Each of the lenses described in Examples 1 and 2 were observed to be photochromic, i.e., each changed color on exposure to ultraviolet radiation, e.g., a 365 nm black light, and subsequently returned to its original color after removal of the ultraviolet radiation. Further, the spent resin films coated on the lenses were easily removed by washing in warm water.

It was observed during preparation of the lenses of Example 1 that the higher the level of poly(vinyl pyrrolidone) in the resin composition the less the coating tended to soften and flow at thermal transfer temperatures. However, the presence of HPC in the resin composition appeared to improve the coating flowout during application of the film to the surface of the lenses. Resin flow during thermal transfer was not observed for the lenses of Example 2. This was believed to be a consequence of the lower solubility of the photochromic material of Example 2 in the solution composition and therefore the lower level of such photohromic in the resin composition compared to Example 1.

Although the present invention has been described with reference to the specific details of particular embodiments thereof, it is not intended that such details be regarded as limitations upon the scope of the invention except insofar as and to the extent that they are included in the accompanying claims.

What is claimed is:

1. A water-strippable organic resin photochromic substance-containing composition consisting essentially of (a) an organic photochromic substance and (b) a blend of from about 5 to about 50 parts of hydroxy ($C_2$–$C_3$) alkyl cellulose and from about 95 to about 50 parts of poly(vinyl pyrrolidone).

2. The resin composition of claim 1 wherein the hydroxy alkyl cellulose is hydroxy propyl cellulose having a weight average molecular weight of from about 60,000 to about 120,000, and the poly(vinyl pyrrolidone) has a number average molecular weight of from about 160,000 to about 360,000.

3. A solution of the resin composition of claim 2 and a $C_1$–$C_5$ aliphatic alcohol.

4. The solution of claim 3 wherein the lower aliphatic alcohol is butanol.

5. The resin composition of claim 1 wherein component (b) is a blend of from about 5 to about 30 parts of hydroxy ($C_2$–$C_3$) alkyl cellulose and from about 95 to about 70 parts of poly(vinyl pyrrolidone).

6. The resin composition of claim 1 wherein component (b) is a blend of from about 5 to about 15 parts of hydroxy ($C_2$–$C_3$) alkyl cellulose and from about 95 to about 85 parts of poly(vinyl pyrrolidone).

7. The resin composition of claim 5 wherein the hydroxy alkyl cellulose is hydroxy propyl cellulose having a weight average molecular weight of from about 60,000 to about 120,000, and the poly(vinyl pyrrolidone) has a number average molecular weight of from about 160,000 to about 360,000.

8. The resin composition of claim 6 wherein the hydroxy alkyl cellulose is hydroxy propyl cellulose having a weight average molecular weight of from about 60,000 to about 120,000, and the poly(vinyl pyrrolidone) has an average molecular weight of from about 160,000 to about 360,000.

9. The resin composition of claim 2 wherein the photochromic substance is selected from the group consisting of spiro(indolino) naphthoxazines, spiro(indolino)

pyridobenzoxazines, spiro(indolino) benzoxazines, spiro(benzindolino) naphthoxazines, spiro(benzindolino) pyridobenzoxazines, spiro(benzindolino) benzoxazines, and mixtures of such spiro(indolino)-type photochromic substances.

10. The resin composition of claim 2 wherein the photochromic substance is selected from the group consisting of spiro(indolino) naphthoxazines, spiro(indolino) pyridobenzoxazines, spiro(indolino) benzoxazines, chromenes and mixture of such photochromic substances.

* * * * *